United States Patent [19]

Sugiyama

[11] Patent Number: 5,195,603

[45] Date of Patent: Mar. 23, 1993

[54] ELECTRO-HYDRAULIC CONTROL APPARATUS FOR REAR WHEEL STEERING MECHANISM

[75] Inventor: Mizuho Sugiyama, Toyota, Japan

[73] Assignee: Toyota Jidosha Kabushiki Kaisha, Toyota, Japan

[21] Appl. No.: 793,727

[22] Filed: Nov. 21, 1991

[30] Foreign Application Priority Data

Nov. 21, 1990 [JP] Japan .................. 2-316868

[51] Int. Cl.⁵ .............................................. B62D 5/06
[52] U.S. Cl. .................................. 180/132; 180/140; 180/79.1
[58] Field of Search ............... 180/132, 133, 140, 142, 180/79.1; 364/424.05

[56] References Cited

FOREIGN PATENT DOCUMENTS

| 199568 | 9/1987 | Japan. | |
| 149267 | 6/1988 | Japan | 180/140 |
| 48275 | 2/1990 | Japan | 180/140 |

Primary Examiner—Charles A. Marmor
Assistant Examiner—Andrew C. Pike
Attorney, Agent, or Firm—Cushman, Darby & Cushman

[57] ABSTRACT

An electro-hydraulic control apparatus for a rear wheel steering mechanism includes a pair of electromagnetic flow control valves connected to a fluid supply passage respectively through an orifice to produce first and second pilot pressures, a directional control valve arranged to be applied with the first and second pilot pressures for selectively connecting the fluid supply passage to one of opposite fluid chambers of a hydraulic power cylinder in the rear wheel steering mechanism and connecting the other fluid chamber to a fluid reservoir in accordance with a difference between the first and second pilot pressures, and a pair of cut-off valves respectively disposed within first and second distribution passages connecting the directional control valve to the opposite fluid chambers of the power cylinder, the cut-off valves being arranged to be respectively applied with the first and second pilot pressures for permitting the flow of fluid passing through the distribution passages when the pilot pressures are maintained higher than a predetermined value and for interrupting the flow of fluid passing through the distribution passages when the pilot pressures become lower than the predetermined value.

2 Claims, 5 Drawing Sheets

ELECTRO-HYDRAULIC CONTROL APPARATUS FOR REAR WHEEL STEERING MECHANISM

BACKGROUND OF THE INVENTION

1. Field of the Invention

The present invention relates to a four-wheel steering vehicle, and more particularly to an electro-hydraulic control apparatus for a rear wheel steering mechanism of the vehicle which includes a hydraulic power cylinder arranged to be operated under control of fluid under pressure supplied thereto for effecting axial displacement of a relay rod operatively connected at its opposite ends to a set of dirigible rear road wheels.

2. Discussion of the Prior Art

In Japanese Patent Early Publication No. 199568/1987, there has been proposed such an electro-hydraulic control apparatus for a rear wheel steering mechanism as described above. The electro-hydraulic control apparatus includes a steering angle ratio control mechanism mechanically connected to a front wheel steering mechanism and electrically connected to an electric control apparatus and a directional control valve arranged to be operated under control of the steering angle ratio control mechanism for selectively connecting a fluid supply passage to one of opposite fluid chambers of the power cylinder and connecting a discharge passage to the other fluid chamber of the power cylinder. In operation of the directional control valve, the rear road wheels are steered in response to steerage of the front road wheels of the vehicle, and the steering angle ratio of the rear road wheels relative to the front road wheels is electrically controlled at the steering angle ratio control mechanism.

In the electro-hydraulic control apparatus, an electromagnetic flow control valve is disposed within the fluid supply passage and the discharge passage at the upstream of the directional control valve to provide a fluid communication between the passages in its deenergized condition and to interrupt the fluid communication between the passages in its energized condition, and a cut-off valve is disposed within the fluid supply passage and the discharge passage at the downstream of the directional control valve to be applied with a first pilot pressure from the fluid supply passage between the flow control valve and the directional control valve and with a second pilot pressure from the discharge passage between the flow control valve and the directional control valve. In operation, the cut-off valve acts to permit the flow of fluid passing through the fluid supply passage and discharge passage only when the first pilot pressure is maintained higher than the second pilot pressure. When the first pilot pressure becomes equal to the second pilot pressure in the occurrence of trouble of the fluid supply system, the cut-off valve acts to interrupt the fluid communication between the directional control valve and the power cylinder thereby to restrict steerage of the rear road wheels. In the occurrence of trouble of the electric control apparatus, the electromagnetic flow control valve is deenergized to provide the fluid communication between the fluid supply passage and the discharge passage thereby to forcibly equalize the first and second pilot pressures. Thus, the cut-off valve acts to interrupt the fluid communication between the directional control valve and the power cylinder for restriction of steerage of the rear road wheels.

In the electro-hydraulic control apparatus, however, the foregoing fail-safe function may not be effected in the occurrence of trouble of either the flow control valve or the cut-off valve.

SUMMARY OF THE INVENTION

It is, therefore, a primary object of the present invention to provide an electro-hydraulic control apparatus for the rear wheel steering mechanism capable of effecting the foregoing fail-safe function in a more reliable manner.

According to the present invention, the object is accomplished by providing an electro-hydraulic control apparatus for a rear wheel steering mechanism having a hydraulic power cylinder arranged to be operated under control of fluid under pressure supplied thereto for steering a set of rear road wheels, which comprises a fluid supply passage connected to a source of fluid pressure, a first bypass passage bifurcated from the fluid supply passage to permit therethrough the flow of fluid under pressure into a fluid reservoir, a first orifice disposed within the first bypass passage to throttle the flow of fluid passing therethrough, a first electromagnetic flow control valve disposed within the first bypass passage at a downstream of the first orifice to decrease the flow quantity of fluid passing through the first bypass passage in accordance with an increase of the electric power applied thereto, a second bypass passage bifurcated from the fluid supply passage to permit therethrough the flow of fluid under pressure into the reservoir, a second orifice disposed within the second bypass passage to throttle the flow of fluid passing therethrough, a second electromagnetic flow control valve disposed within the second bypass passage at a downstream of the second orifice to decrease the flow quantity of fluid passing through the second bypass passage in accordance with an increase of the electric power applied thereto, a directional control valve arranged to be applied with a first pilot pressure from the first bypass passage between the first orifice and the first flow control valve and a second pilot pressure from the second bypass passage between the second orifice and the second flow control valve, the directional control valve being designed to selectively connect the fluid supply passage to one of opposite fluid chambers of the power cylinder and connect the other fluid chamber to the reservoir in accordance with a difference between the first and second pilot pressures, and first and second cut-off valves respectively disposed within first and second distribution passages connecting the directional control valve to the opposite fluid chambers of the power cylinder, the first cut-off valve being arranged to be applied with the first pilot pressure for permitting the flow of fluid passing through the first distribution passage when the first pilot pressure is higher than a predetermined value and for interrupting the flow of fluid passing through the first distribution passage when the first pilot pressure becomes lower than the predetermined value, while the second cut-off valve being arranged to be applied with the second pilot pressure for permitting the flow of fluid passing through the second distribution passage when the second pilot pressure is maintained higher than the predetermined value and for interrupting the flow of fluid passing through the second distribution passage when the second pilot passage becomes lower than the predetermined value.

BRIEF DESCRIPTION OF THE DRAWINGS

Other objects, features, and advantages of the present invention will be more readily appreciated from the following detailed description of a preferred embodiment thereof when taken together with the accompanying drawings, in which.

DESCRIPTION OF THE PREFERRED EMBODIMENT

Figure 1:
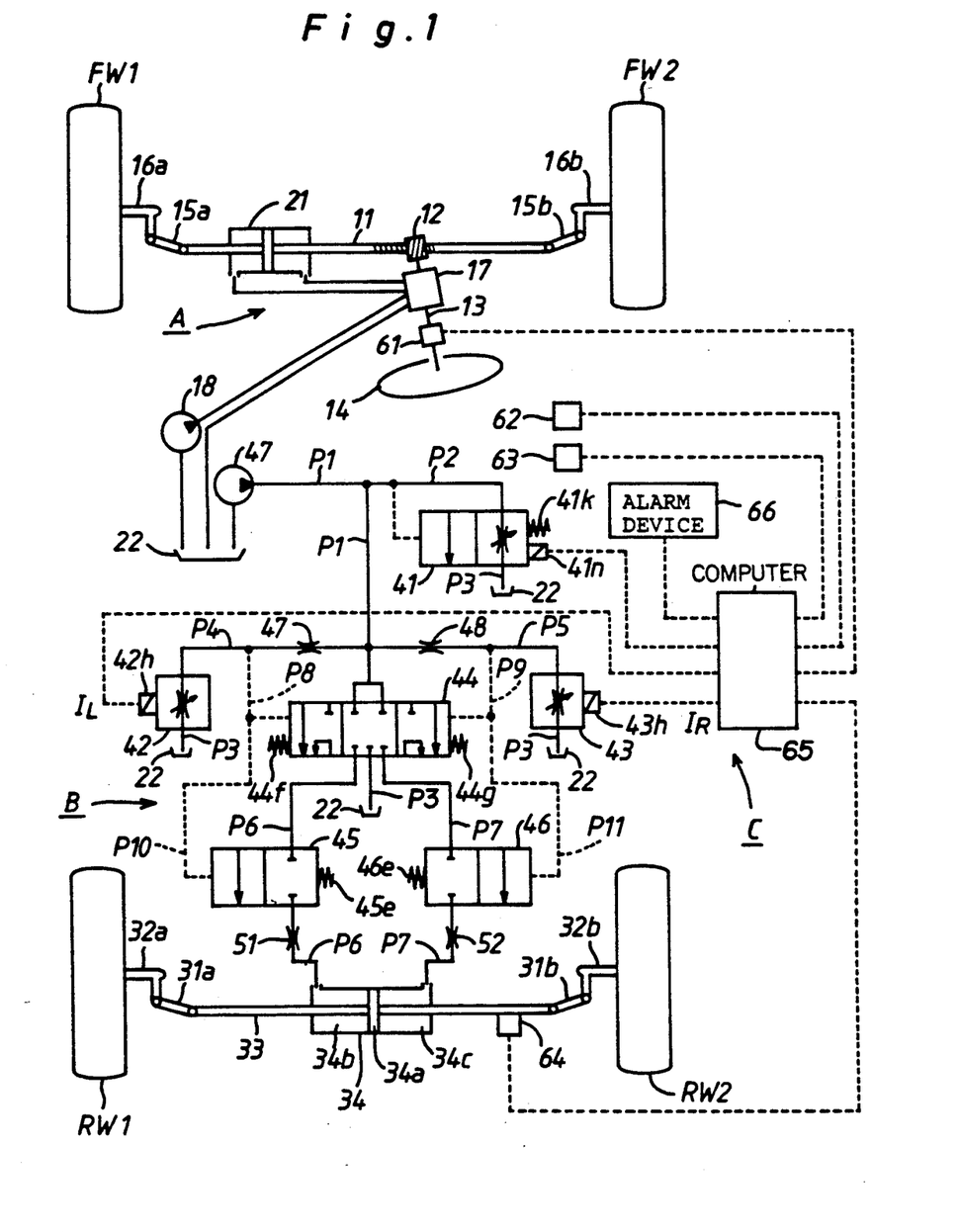
FIG. 1 is a schematic illustration of a four-wheel steering system in an automotive vehicle.

In FIG. 1 of the drawings, there is schematically illustrated a four-wheel steering system in an automotive vehicle, which includes a front wheel steering mechanism A for a set of dirigible front and road wheels FW1, FW2, a rear wheel steering mechanism B for a set of dirigible rear road wheels RW1, RW2, and an electric control apparatus C for the rear wheel steering mechanism B. The front wheel steering mechanism A includes a lateral rack bar 11 arranged to steer the front road wheels FW1, FW2. The rack bar 11 has a toothed portion in mesh with a pinion 12 fixed to the lower end of a steering shaft 13. A steering wheel 14 is fixedly mounted on the upper end of steering shaft 13 for rotation therewith. The rack bar 11 is axially movably supported by a hydraulic power cylinder 21 and operatively connected at its opposite ends to the front road wheels FW1, FW2 by means of a pair of tie rods 15a, 15b and a pair of knuckle arms 16a, 16b. Assembled with the lower portion of steering shaft 13 is a mechanical changeover valve 17 in the form of a four way valve which is operated by a steering effort applied thereto to selectively supply fluid under pressure from a hydraulic pump 18 into one of opposite chambers of the hydraulic power cylinder 21 and to deliver the fluid discharged from the other fluid chamber of power cylinder 21 into a fluid reservoir 22. Under control of the changeover valve 17, the power cylinder 21 is operated to assist axial displacement of the rack bar 11.

Figure 2:
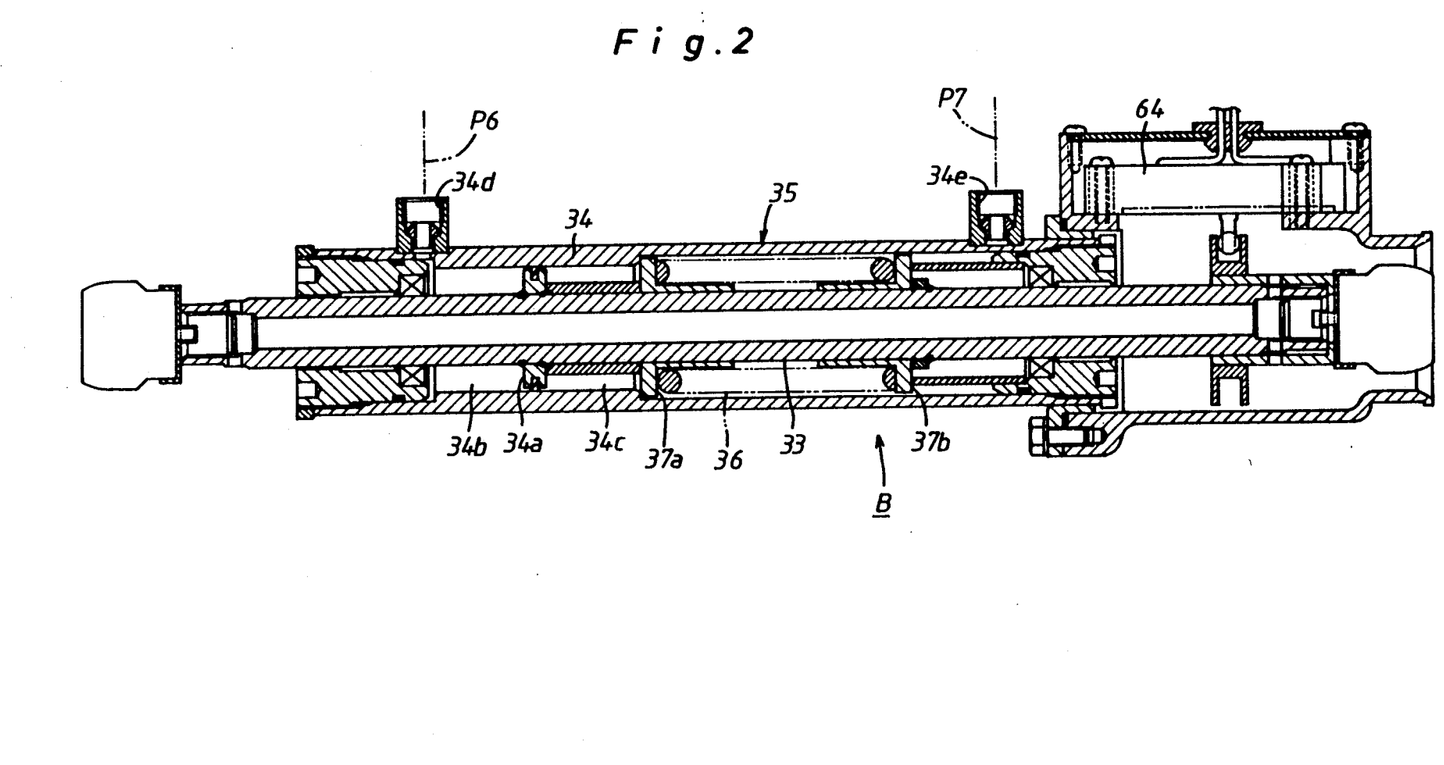
FIG. 2 is a sectional view of a hydraulic power cylinder in a rear wheel steering mechanism shown in FIG. 1.

The rear wheel steering mechanism B includes a lateral relay rod 33 operatively connected at its opposite ends to the rear road wheels RW1, RW2 by means of a pair of tie rods 31a, 31b and a pair of knuckle arms 32a, 32b. The relay rod 33 is arranged to be axially displaced by operation of a hydraulic power cylinder 34. As shown in FIG. 2, the relay rod 33 is axially movably supported by a cylinder 34. The interior of power cylinder 34 is subdivided into left and right fluid chambers 34b and 34c by means of a piston 34a axially slidably assembled therein. The cylindrical housing 35 is provided thereon with left and right ports 34d and 34e which are arranged to selectively supply and discharge fluid under pressure to and from the fluid chambers 34b, 34c. Assembled within the right fluid chamber 34c of power cylinder 34 is a return coil spring 36 which is supported by engagement with a pair of axially spaced retainers 37a, 37b on the relay rod 33. The outward displacement of retainers 37a and 37b is restricted by engagement with internal walls of cylindrical housing 35 such that the relay rod 33 is retained in a neutral position under the load of coil spring 36.

Figure 3:
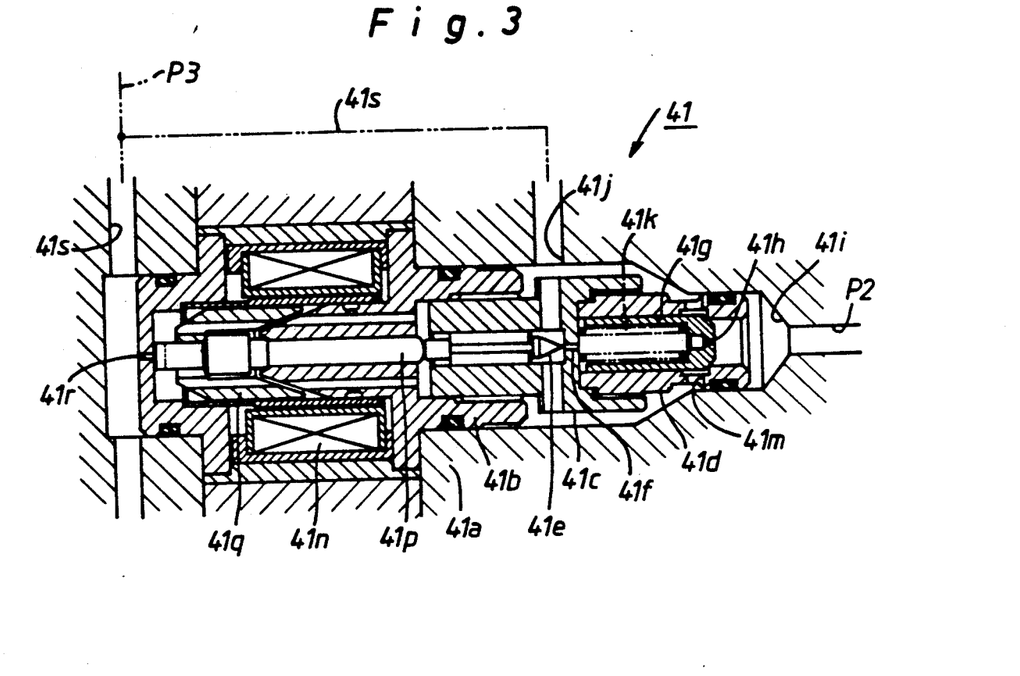
FIG. 3 is a sectional view of first electromagnetic flow control valve shown in FIG. 1.

As shown in FIG. 1, a hydraulic control apparatus for the rear wheel steering mechanism B includes electromagnetic flow control valves 41, 42, and 43, a directional control valve 44, and cut-off valves 45, 46 which are arranged to control the flow of fluid supplied into and discharged from the power cylinder 34. The electromagnetic flow control valve 41 is disposed between a bypass passage $P_2$ bifurcated from a fluid supply passage $P_1$ in connection to a hydraulic pump 47 and a discharge passage $P_3$ in connection to the fluid reservoir 22. As shown in FIG. 3, the flow control valve 41 includes a housing 41a provided therein with a stationary magnetic core 41b, an outer sleeve 41c threadedly coupled within a front portion of magnetic core 41b and an inner sleeve 41d threadedly coupled within a front portion of outer sleeve 41c. A needle valve body 41e is axially slidably disposed within a rear portion of outer sleeve 41c and is opposed at its front end to an orifice 41f in outer sleeve 41c to be urged backward by the fluid under pressure applied thereto through the orifice 41f. The upstream of orifice 41f is communicated with the bypass passage $P_2$ through an orifice 41h in a spool valve body 41g and an inlet port 41i of housing 41a, while the downstream of orifice 41f is communicated with the discharge passage $P_3$ through a discharge port 41j of housing 41a.

The spool valve body 41g is axially slidably disposed within the inner sleeve 41d and biased forward under the load of a compressed coil spring 41k of large spring constant to be retained in a position shown in FIG. 3 for permitting the flow of fluid under pressure supplied therein from the inlet port 41a through the orifice 41h. When applied with the fluid pressure in excess, the spool valve body 41g is moved backward against the load of coil spring 41k to permit the flow of fluid discharged into the discharge port 41j through a radial hole 41m of inner sleeve 41d. The magnetic core 41b is surrounded by a solenoid winding 41n at its rear portion and receives an axially slidable rod 41p assembled therein. The rod 41p is engaged with the rear end of needle valve body 41e at its front end and secured to an axially movable plunger 41c at its rear end.

The rod 41p is thrusted forward by energization of the solenoid winding 41n to cause forward movement of the needle valve body 41e. In this instance, the forward thrust force acting on the rod 41p increases in accordance with an increase of the electric power supplied to the solenoid winding 41n, and, in turn, the needle valve body 41e is positioned by balance of the forward thrust force and the fluid pressure applied thereto from the orifice 41f. Thus, the amount of fluid discharged into the discharge port 41j from the orifice 41f is restricted in accordance with the increase of the electric power to increase the pressure in the inlet port 41i and bypass passage $P_2$ and maintain it in a high value. In the flow control valve assembly 41, a rear space confined by the rear ends of rod 41p and plunger 41q is communicated with the discharge passage $P_3$ through a hole 41r and a passage 41s to smoothly conduct the axial movement of the needle valve body 41e, rod 41p and plunger 41q.

Figure 4:
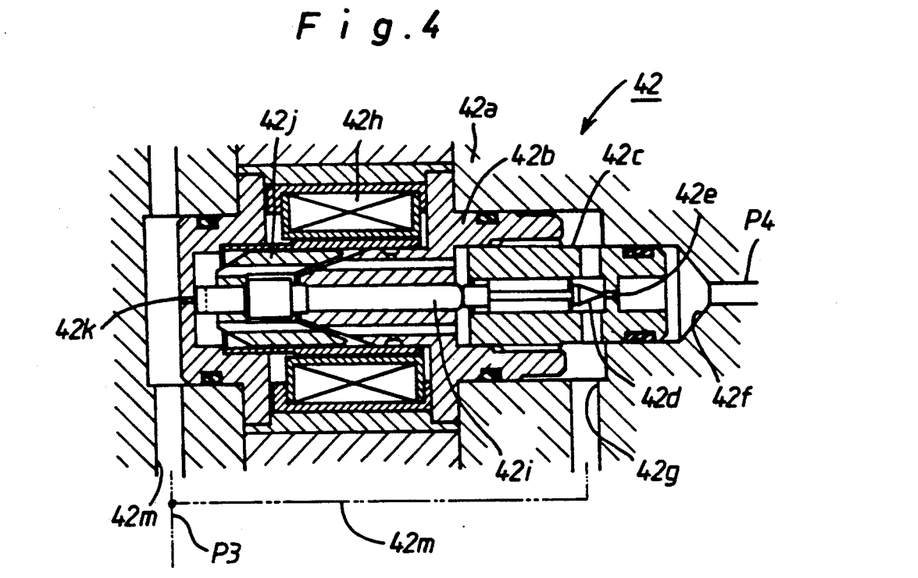
FIG. 4 is a sectional view of a second electromagnetic flow control valve shown in FIG. 1.

The electromagnetic flow control valve 42 is disposed between a bypass passage $P_4$ bifurcated from the fluid supply passage $P_1$ and the discharge passage $P_3$ in connection to the reservoir 22, while the electromagnetic flow control valve 43 is disposed between a bypass passage $P_5$ bifurcated from the fluid supply passage $P_1$ and the discharge passage $P_3$ in connection to the reservoir 22. The bypass passage $P_4$ is provided with an orifice 41 to throttle the flow of the fluid passing therethrough, while the bypass passage $P_5$ is provided with an orifice 48 to throttle the flow of the fluid passing therethrough. As shown in FIG. 4, the electromagnetic flow control valve 42 includes a housing 42a provided therein with a stationary magnetic core 42b and an inner sleeve 42c threadedly coupled within a front portion of magnetic core 42b. A needle valve body 42d is axially slidably disposed within a rear portion of inner sleeve 42c and is opposed at its front end to an orifice 42e in inner sleeve 42c to be urged backward by the pressure of fluid supplied through the orifice 42e. The upstream of orifice 42e is communicated with the bypass passage $P_4$ through an inlet port 42f of housing 42a, while the downstream of orifice 42e is communicated with the discharge passage $P_3$ through a discharge port 42g of housing 42a.

The magnetic core 42b is surrounded by a solenoid winding 42h at its rear portion and receives an axially slidable rod 42i assembled therein. The rod 42i is engaged with the rear end of needle valve body 42d at its front end and secured to an axially movable plunger 42j at its rear end. The rod 42i is thrusted forward by energization of the solenoid winding 42h to cause forward movement of the needle valve body 42d. In this instance the forward thrust force acting on the rod 42i increases in accordance with an increase of the electric power applied to the solenoid winding 42h, and, in turn, the needle valve body 42d is positioned by balance of the forward thrust force and the pressure of fluid supplied from the orifice 42e. Thus, the amount of fluid discharged into the discharge port 42g from the orifice 42e is restricted in accordance with the increase of the electric power to increase the pressure in the inlet port 42f and bypass passage $P_4$ and maintain it in a high value. In the flow control valve assembly 42, a rear space confined by the rear ends of rod 42i and plunger 42j is communicated with the discharge passage $P_3$ through a hole 42k and a passage 42m to smoothly conduct the axial movement of the needle valve body 42d, rod 42i and plunger 42j.

The electromagnetic flow control valve 43 has the same construction as the electromagnetic flow control valve 42. Similarly to the flow control valve 42, the flow control valve 43 is arranged to restrict the flow of fluid passing therethrough in accordance with an increase of the electric power supplied to its solenoid winding 43h thereby to increase the pressure in bypass passage $P_5$.

Figure 5:
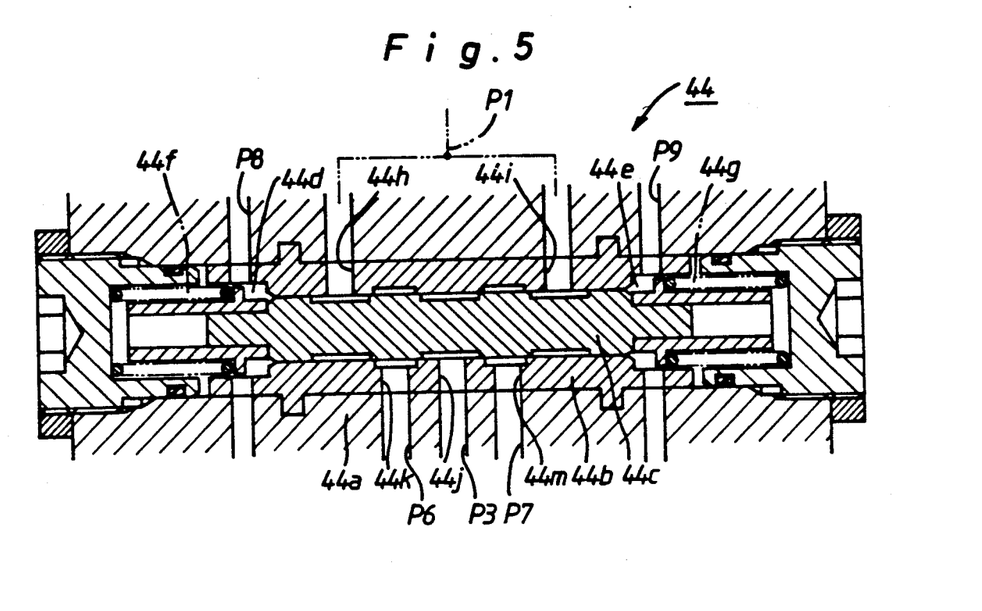
FIG. 5 is a sectional view of a directional control valve shown in FIG. 1.

The directional control valve 44 is disposed between the fluid supply passage $P_1$ and the discharge passage $P_3$ in connection to the reservoir 22 to selectively connect the fluid supply passage $P_1$ to one of distribution passages $P_6$ or $P_7$ and connect the other distribution passage $P_7$ or $P_6$ to the discharge passage $P_3$. The directional control valve 44 is connected at its left side to the bypass passage $P_4$ between the orifice 47 and flow control valve 42 by means of a pilot passage $P_8$ and at its right side to the bypass passage $P_5$ between the orifice 48 and flow control valve 43 by means of a pilot passage $P_9$. As shown in FIG. 5, the directional control valve 44 includes a housing 44a provided therein with a stationary sleeve 44b and a valve spool 44c axially slidably assembled within the stationary sleeve 44b. Formed at the opposite ends of valve spool 44c are a pair of pilot chambers 44d, 44e which are respectively in open communication with the pilot passages $P_8$, $P_9$. A pair of axially spaced coil springs 44f, 44g are contained within the pilot chambers 44d, 44e to retain the valve spool 44c in a neutral position.

The valve housing 44a is provided with inlet ports 44h, 44i connected to the fluid supply passage $P_1$, a discharge port 44j connected to the discharge passage $P_3$ and distribution ports 44k, 44m respectively connected to the distribution passages $P_6$, $P_7$. When the pressure in pilot chambers 44d and 44e is equally balanced, the valve spool 44c is retained in its neutral position under the load of coil springs 44f, 44g to interrupt the fluid communication between the ports 44h, 44i and the ports 44j, 44k, 44m. When the pressure in pilot chamber 44d becomes higher than that in pilot chamber 44e, the valve spool 44c is displaced rightward to connect the fluid supply inlet port 44h to the distribution port 44k and to connect the distribution port 44m to the discharge port 44j. When the pressure in pilot chamber 44e becomes higher than that in pilot chamber 44d, the valve spool 44c is displaced leftward to connect the fluid supply inlet port 44i to the distribution port 44m and to connect the distribution port 44k to the discharge port 44j.

Figure 6:
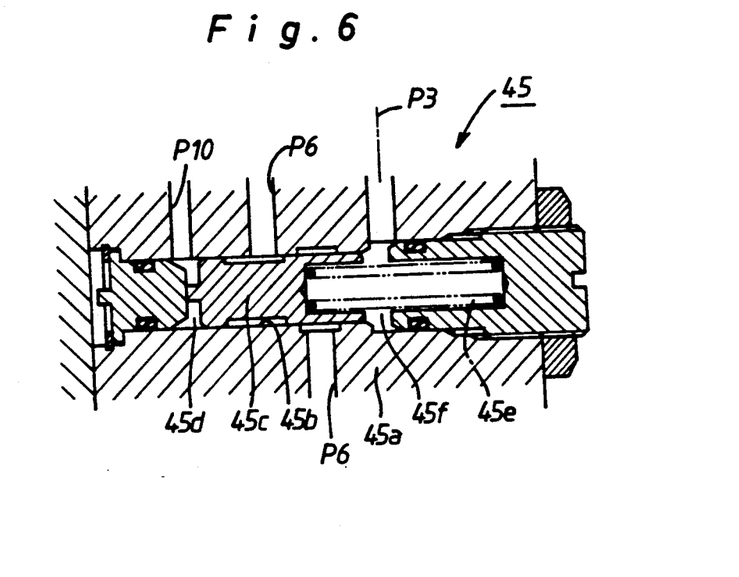
FIG. 6 is a sectional view of a cut-off valve shown in FIG. 1.

The cut-off valves 45, 46 are respectively disposed within the distribution passages $P_6$, $P_7$ and connected to the pilot passages $P_8$, $P_9$ through passages $P_{10}$, $P_{11}$. The distribution passages $P_6$, $P_7$ are respectively connected to the left and right chambers 34b, 34c of power cylinder 34 and provided with orifices 51, 52 between the cut-off valves 45, 46 and the power cylinder 34. As shown in FIG. 6, the cut-off valve 45 includes a housing 45a and a valve spool 45c axially slidably disposed within a bore 45b of housing 45a. A pilot chamber 45d formed at the left side of valve spool 45c is connected to the pilot passage $P_{10}$, while a coil spring 45e is contained within a chamber formed at the right side of valve spool 45c to bias the valve spool 45c toward the pilot chamber 45d. When the pressure in pilot chamber 45d is maintained larger than the biasing force of spring 45e, the valve spool 45c is positioned to permit the flow of fluid passing through the distribution passage $P_6$. When the pressure in pilot chamber 45d becomes smaller than the biasing force of spring 45e, the valve spool 45c is positioned to interrupt the flow of fluid passing through the distribution passage $P_6$. The cut-off valve 46 has the same construction as the cut-off valve 45. When the pressure in pilot passage $P_{11}$ is maintained larger than the biasing force of a spring 46e, the cut-off valve 46 is positioned to permit the flow of fluid passing through the distribution passage $P_7$. When the pressure in pilot passage $P_{11}$ becomes smaller than the biasing force of spring 46e, the cut-off valve 46 is positioned to interrupt the flow of fluid passing through the distribution passage $P_7$.

The electric control apparatus C includes a microcomputer 65 connected to a front wheel steering angle sensor 61, a vehicle speed sensor 62, a yaw-rate sensor 63, and a rear wheel steering angle sensor 64. The front wheel steering angle sensor 61 is arranged to detect a rotation angle of the steering shaft 13 for producing an electric signal indicative of an instant front steering angle δf. The vehicle speed sensor 62 is arranged to detect a rotational number of an output shaft of the vehicle power transmission for producing an electric signal indicative of a travel speed V of the vehicle. The yaw-rate sensor 63 is arranged to detect an angular speed about a vertical axis at the center of gravity of the vehicle body for producing an electric signal indicative of a yaw-rate ω of the vehicle body. As shown in FIGS. 1 and 2, the rear wheel steering angle sensor 64 is arranged to detect an axial displacement amount of the relay rod 33 for producing an electric signal indicative of an instant rear wheel steering angle δr of the rear road wheels RW1, RW2. In this embodiment, the instant steering angles δf and δr each are detected as a positive value when the front and rear road wheels are steered rightward and as a negative value when the front and rear road wheels are steered leftward. The yaw-rate ω is detected as a positive value when the vehicle has been turned rightward and as a negative value when the vehicle has been turned leftward. The microcomputer 65 includes a read-only memory or ROM, a central processing unit or CPU, and a random access memory or RAM which are arranged to execute a control program shown by a flow chart in FIG. 7 for control of the power supply to the flow control valves 41, 42, and 43 and for control of an alarm device 66 such as an alarm lamp or buzzer. The ROM is designed to memorize the control program and to memorize coefficients K1, K2 in relation to the vehicle speed in the form of a table shown in FIG. 8.

Figures 7, 8:
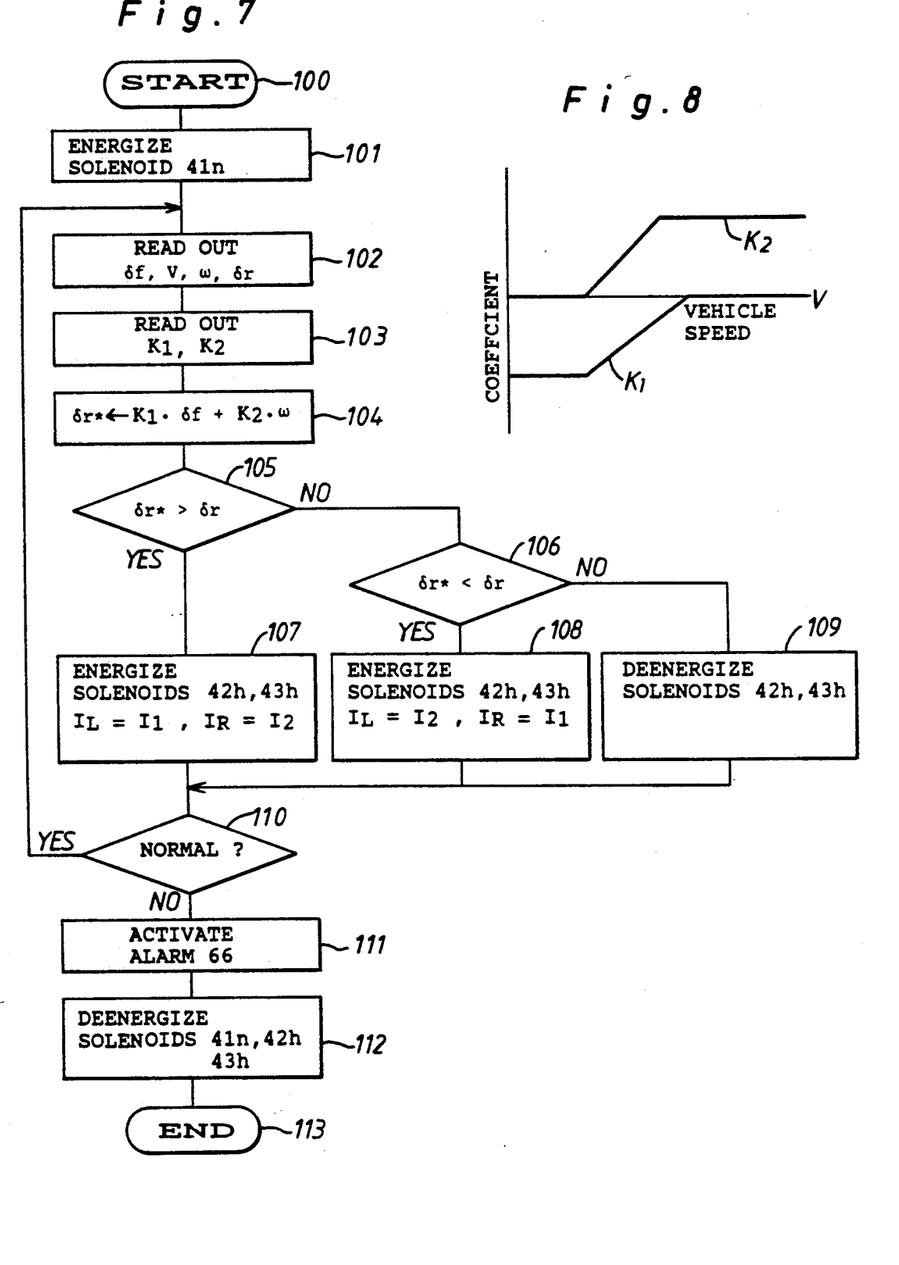
FIG. 7 is a flow chart of a control program to be executed by a microcomputer shown in FIG. 1.
FIG. 8 is a graph showing characteristics of coefficients in relation to the vehicle speed.

Hereinafter, the operation of the rear wheel steering mechanism B will be described in detail. Assuming that the steering wheel 14 has been turned rightward or leftward under a normal condition of the electrohydraulic control apparatus for the rear wheel steering mechanism B, the front road wheels FW1, FW2 are steered by a steering effort applied thereto from the steering wheel 14 through the steering shaft 13. Simultaneously, the power cylinder 21 is operated under control of the changeover valve 17 to assist the steerage of front road wheels FW1, FW2. In this instance, the CPU of computer 65 starts to execute the control program at step 100 shown in FIG. 7 and applies, at step 101, an electric current of a predetermined value to the solenoid winding 41n of flow control valve 41. Thus, the flow control valve 41 is operated to restrict the flow quantity of fluid passing through the bypass passage P$_2$ in accordance with energization of the solenoid winding 41n thereby to maintain the pressure in fluid supply passage P$_1$ in a predetermined value. Subsequently, the CPU of computer 65 reads out, at step 102, the front and rear wheel steering angles δf, δr, vehicle speed V, and yaw-rate ω in response to the electric signals applied thereto from the sensor 61–64 and reads out, at step 103, coefficients K$_1$, K$_2$ in relation to the vehicle speed V. After processing at step 103, the CPU of computer 65 calculates the following equation at step 104 to determine an optimum rear wheel steering angle δr*.

$$\delta r^* = K_1 \delta f + K_2 \omega$$

At the following step 105, the CPU of computer 65 compares the calculated optimum rear wheel steering angle δr* with the instant rear wheel steering angle δr. When the calculated optimum rear wheel steering angle for δr* is greater than the instant rear wheel steering angle δr, then the answer at step 105 is "YES", and the program proceeds to step 107 where the CPU of computer 65 energizes the solenoid windings 42h, 43h of flow control valves 42, 43. In this instance, the CPU of computer 65 controls the electric current I$_L$ applied to the solenoid winding 42h to a predetermined low value I$_1$ > 0 and controls the electric current I$_R$ applied to the solenoid winding 43h to a predetermined high value I$_2$ > I$_1$. Thus, the flow control valve 42 is operated to slightly restrict the flow of fluid passing through the bypass passage P$_4$ in accordance with the electric current I$_L$ thereby to maintain the pressure in bypass passage P$_4$ in a predetermined low value. In this instance, the pressure in bypass passage P$_4$ is maintained to overcome the biasing force of spring 45e acting on the valve spool 45c in cut-off valve 45. On the other hand, the flow control valve 43 is operated to greatly restrict the flow of fluid passing through the bypass passage P$_5$ in accordance with the electric current I$_R$ thereby to maintain the pressure in bypass passage P$_5$ in a predetermined high value. As a result, the pressure in pilot passages P$_9$, P$_{11}$ becomes higher than that in pilot passages P$_8$, P$_{10}$.

Thus, the directional control valve 44 is shifted leftward to connect the fluid supply passage P$_1$ to the distribution passage P$_7$ and to connect the distribution passage P$_6$ to the discharge passage P$_3$. Simultaneously, the cut-off valves 45, 46 are shifted by the pressure in pilot passages P$_{10}$, P$_{11}$ to permit the flow of fluid passing respectively through the distribution passages P$_6$, P$_7$. Consequently, the fluid under pressure from pump 47 is supplied to the right chamber 34c of power cylinder 34 through the passages P$_1$, P$_7$, while the fluid from the left chamber 34b is discharged through the passages P$_6$, P$_3$. Thus, the power cylinder 34 is operated to cause leftward displacement of the relay rod 33 to steer the rear road wheels RW1, RW2 rightward.

When the calculated optimum rear wheel steering angle δr* is smaller than the instant rear wheel steering angle δr, the CPU of computer 65 determines a "NO" answer at step 105 and a "YES" answer at step 106 and causes the program to proceed to step 108. At this step, the CPU of computer 65 energizes the solenoid windings 42h, 43h of flow control valves 42, 43 and controls the electric current I$_L$ applied to the solenoid winding 42h to the predetermined high value I$_2$ and the electric current I$_R$ applied to the solenoid winding 43h to the predetermined low value I$_1$. As a result, the pressure in bypass passage P$_4$ becomes higher than that in bypass passage P$_5$. Thus, the directional control valve 44 is shifted rightward to connect the fluid supply passage P$_1$ to the distribution passage P$_6$ and to connect the distribution passage P$_7$ to the discharge passage P$_3$. Simultaneously, the cut-off valves 45, 46 are shifted to permit the flow of fluid passing respectively through the distribution passages P$_6$, P$_7$. Consequently, the left chamber 34b of power cylinder 34 is supplied with the fluid under pressure from the fluid supply passage P$_1$ through the distribution passage P$_6$, while the fluid from the right chamber 34c of power cylinder 34 is discharged through the distribution passage P$_7$ and discharge passage P$_3$. Thus, the power cylinder 34 is operated to cause rightward displacement of the relay rod 33 to steer the rear road wheels RW1, RW2 leftward.

When the calculated optimum rear wheel steering angle δr* is equal to the instant rear wheel steering angle δr, the CPU of computer 65 determines a "NO" answer respectively at step 105 and 106 and causes the program to proceed to step 109. At this step, the CPU of computer 65 deenergizes the solenoid windings 42h, 43h of flow control valves 42, 43. In this instance, the flow control valves 42, 43 do not act to restrict the flow of fluid passing therethrough. This results in decrease of the pressure in bypass passages $P_4$, $P_5$ and in pilot passages $P_8$–$P_{11}$. Thus, the directional control valve 44 is retained in its neutral position under the load of coil springs 44f, 44g to interrupt the fluid communication between the fluid passage $P_1$ and the distribution passages $P_6$, $P_7$. Similarly, the cut-off valves 45, 46 are shifted to their closed positions under the load of springs 45e, 46e to interrupt the flow of fluid passing respectively through the distribution passages $P_6$, $P_7$. Consequently, the hydraulic fluid in left and right chambers 34b, 34c of power cylinder 34 is confined to retain the relay rod 33 in its displaced position and to maintain the rear road wheels RW1, RW2 in their steered positions.

After processing at step 105 to 109, the CPU of computer 65 determines at step 110 whether the rear road wheels RW1, RW2 are normally steered or not. If the answer at step 110 is "YES", the CPU of computer 65 returns the program to step 102 and repeats the execution of the program at step 102–110 to steer the rear road wheels RW1, RW2 at an optimum rear wheel steering angle δr* calculated at step 104. In such control of the rear road wheels, the coefficient $K_1$ is read out as a negative value during low speed travel of the vehicle, while the coefficient $K_2$ is read out as a positive value during high speed travel of the vehicle. Thus, the value of K1 δf in the equation is calculated to steer the rear road wheels RW1, RW2 in the opposite direction relative to the front road wheels FW1, FW2, while the value of K2 ω in the equation is calculated to offset the yaw-rate of the vehicle body. This is useful to facilitate turning of the vehicle at a small angle during low speed travel and to enhance the travel stability of the vehicle at a high speed.

Assuming that the steering control of the rear road wheels has been made in an abnormal condition of the electro-hydraulic control apparatus, the CPU of computer 65 determines a "NO" answer at step 110 and activates the alarm device 66 at step 111. At the following step 112, the CPU of computer 65 deenergizes the solenoid windings 41n, 42h, 43h of flow control valves 41, 42, 43 and ends the execution of the program at step 113. Thus, the driver of the vehicle is informed of an abnormal condition in control of the rear road wheels. In this instance, the flow control valves 41, 42, 43 do not act to restrict the flow of fluid passing respectively through the bypass passages $P_2$, $P_4$, $P_5$. This results in decrease of the pressure in bypass passages $P_2$, $P_4$, $P_5$ and in pilot passages $P_8$–$P_{11}$. Thus, the directional control valve 44 is retained in its neutral position under the load of springs 44f, 44g to interrupt the fluid communication between the fluid supply passage $P_1$ and the distribution passages $P_6$, $P_7$, and the cut-off valves 45, 46 are retained in their closed positions under the load of springs 45e, 46e to interrupt the flow of fluid passing through the distribution passages $P_6$, $P_7$. Consequently, the fluid in the left and right chambers 34b, 34c of power cylinder 34 is confined to restrict axial displacement of the relay rod 33. This is useful to prevent unwanted steerage of the rear road wheels thereby to ensure the travel stability of the vehicle.

Assuming that the needle valve body 41e or rod 41p of flow control valve 41 has been fixed in its forward position under the abnormal condition described above, the pressure in the fluid supply passage $P_1$ may not be decreased due to restriction of the flow of fluid at the flow control valve 41. In this instance, the pressure in pilot passages $P_8$, $P_{10}$ or $P_9$, $P_{11}$ will decrease if the pair of flow control valve 42 and cut-off valve 45 or flow control valve 43 and cut-off valve 46 are each maintained in a normal condition. Thus, either one of the cut-off valves 45 and 46 is shifted to its closed position to interrupt the flow of fluid passing through the distribution passage $P_6$ or $P_7$. As a result, the fluid in the left or right chamber of power cylinder 34 is confined to restrict axial displacement of the relay rod 33. Even if the flow of fluid passing through the distribution passages $P_6$, $P_7$ was permitted due to trouble of both the cut-off valves 45, 46, the pressure in pilot passages $P_8$, $P_9$ would be decreased if the flow control valves 42 and 43 were each maintained in a normal condition. In this instance, the directional control valve 44 would be retained in its neutral position under the load of springs 44f, 44g to confine the fluid in left and right chambers of power cylinder 34 thereby to restrict axial displacement of the relay rod 33.

Assuming that one or some of the flow control valves 42, 43 or cut-off valves 45, 46 has been failed in operation under the deenergized condition of solenoid windings 41n, 42h, 43h, the pressure in fluid supply passage $P_1$ will decrease if the flow control valve 41 is maintained in its normal condition. This results in decrease of the pressure in bypass passages $P_4$, $P_5$ and pilot passages $P_8$–$P_{11}$. in this instance, at least one of the cut-off valves 45, 46 will be shifted to its closed position due to decrease of the pressure in bypass passages $P_4$, $P_5$ and pilot passages $P_8$–$P_{11}$ if it is maintained in its normal condition. Thus, the hydraulic fluid in one of the fluid chambers 34b, 34c of power cylinder 34 is confined to restrict axial displacement of the relay rod 33. Even if the flow of fluid passing through the distribution passages $P_6$, $P_7$ was permitted due to trouble of both the cut-off valves 45, 46, the pressure in pilot passages $P_8$, $P_9$ would be decreased if the flow control valve 41 was maintained in its normal condition. In this instance, the directional control valve 44 would be retained in its neutral position if it was maintained in its normal condition. Thus, the hydraulic fluid in the fluid chambers 34b, 34c of power cylinder 34 is confined to restrict axial displacement of the relay rod 33.

In case the pressure in fluid supply passage $P_1$ is decreased due to stopping of the vehicle prime mover or trouble in the source of fluid pressure such as the pump 47, the pressure in bypass passages $P_4$, $P_5$ and pilot passages $P_8$–$P_{11}$ will decrease. Thus, axial displacement of the relay rod 33 will be restricted in the same manner as described above if either one of the directional control valve 44 or cut-off valves 45, 46 is maintained in its normal condition.

From the above description, it will be understood that in the occurrence of trouble of the hydraulic or electric control system, axial displacement of the relay rod 33 would be restricted under control of some of the normal flow control valves 41–43 or cut-off valves 45, 46 even if the other valves were failed in operation. This is useful to more enhance the fail-safe function of the electrohydraulic control apparatus.

What is claimed is:

1. An electro-hydraulic control apparatus for a rear wheel steering mechanism having a hydraulic power cylinder arranged to be operated under control of fluid under pressure supplied thereto for steering a set of rear road wheels, said apparatus comprising:

- a fluid supply passage connected to a source of the fluid under pressure;
- a first bypass passage bifurcated from said fluid supply passage to permit therethrough flow of the fluid under pressure into a fluid reservoir;
- a first orifice disposed within said first bypass passage to throttle the flow of the fluid passing therethrough;
- a first electromagnetic flow control valve disposed within said first bypass passage downstream of said first orifice to decrease the flow of the fluid passing through said first bypass passage in accordance with an increase of electric power applied thereto;
- a second bypass passage bifurcated from said fluid supply passage to permit therethrough flow of the fluid under pressure into said reservoir;
- a second orifice disposed within said second bypass passage to throttle the flow of the fluid passing therethrough;
- a second electromagnetic flow control valve disposed within said second bypass passage downstream of said second orifice to decrease the flow of the fluid passing through said second bypass passage in accordance with an increase of electric power applied thereto;
- a directional control valve arranged to be applied with a first pilot pressure from said first bypass passage between said first orifice and said first flow control valve and a second pilot pressure from said second bypass passage between said second orifice and said second flow control valve, said directional control valve selectively connecting said fluid supply passage to one of opposite fluid chambers of said power cylinder and connecting another of the fluid chambers to said reservoir in accordance with a difference between the first and second pilot pressures; and
- first and second cut-off valves respectively disposed within first and second distribution passages connecting said directional control valve to the opposite fluid chambers of said power cylinder, said first cut-off valve being arranged to be applied with the first pilot pressure for permitting flow of the fluid passing through said first distribution passage when the first pilot pressure is maintained higher than a predetermined value and for interrupting the flow of the fluid passing through said first distribution passage when the first pilot pressure becomes lower than the predetermined value, while said second cut-off valve being arranged to be applied with the second pilot pressure for permitting flow of the fluid passing through said second distribution passage when the second pilot pressure is maintained higher than the predetermined value and for interrupting the flow of the fluid passing through said second distribution passage when the second pilot pressure becomes lower than the predetermined value.

2. An electro-hydraulic control apparatus as claimed in claim 1, further comprising a third bypass passage bifurcated from said fluid supply passage upstream of said first and second bypass passages to permit therethrough flow of the fluid under pressure into said reservoir, and a third electromagnetic flow control valve disposed within said third bypass passage to decrease the flow of the fluid passing through said third bypass passage in accordance with an increase of electric power applied thereto.

* * * * *